Aug. 16, 1949.　　　　G. J. LIPSCOMB　　　　2,479,126
LIQUID CLARIFIER

Filed Feb. 8, 1945　　　　　　　　　　　4 Sheets-Sheet 1

Inventor
GASTON J. LIPSCOMB
By Church & Church
His Attorneys

Aug. 16, 1949.　　　G. J. LIPSCOMB　　　2,479,126
LIQUID CLARIFIER
Filed Feb. 8, 1945　　　　　　　　　　4 Sheets-Sheet 2
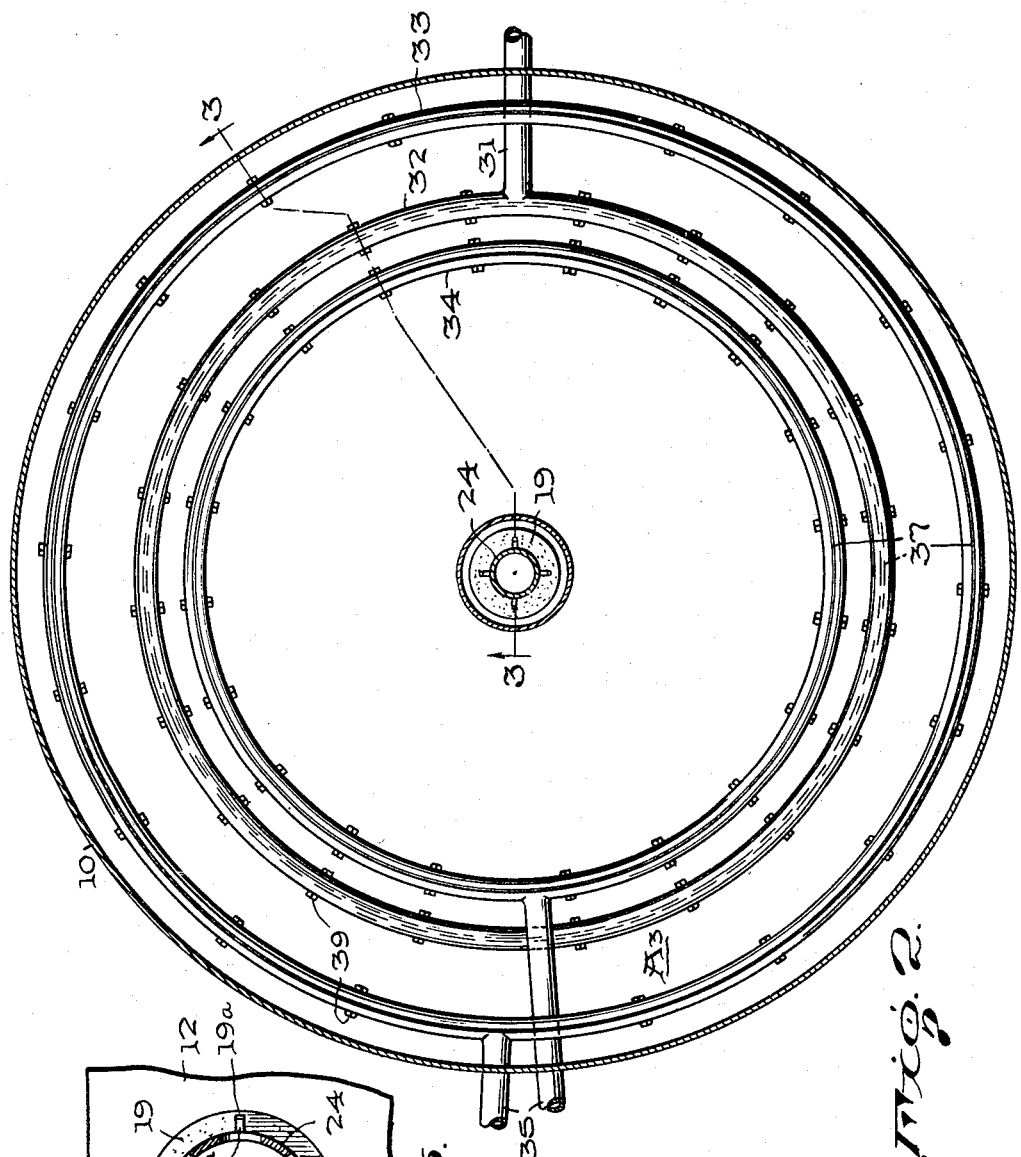
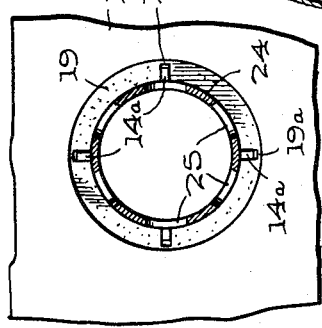
Inventor
GASTON J. LIPSCOMB
By Church & Church
His Attorneys

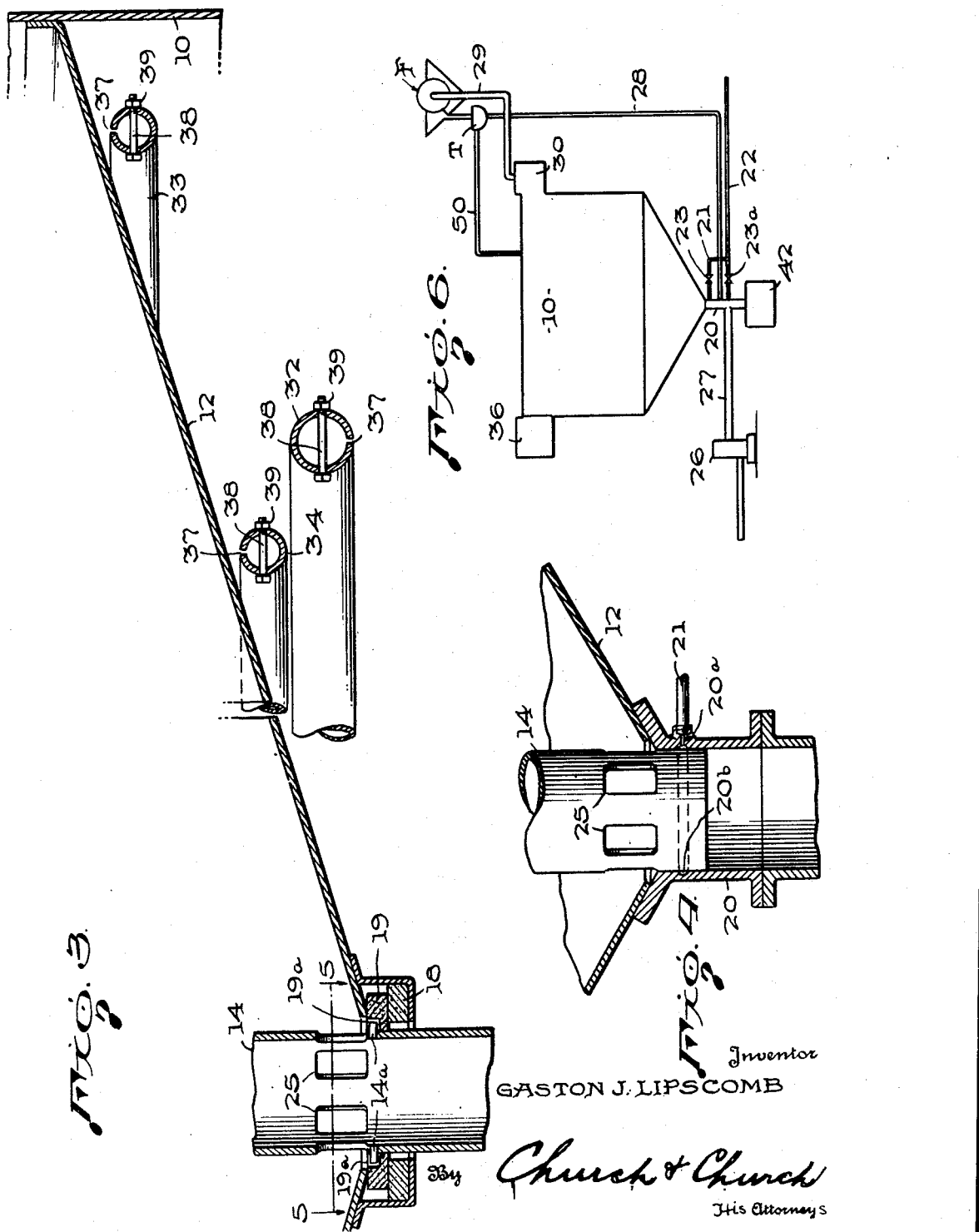

Aug. 16, 1949. G. J. LIPSCOMB 2,479,126
LIQUID CLARIFIER
Filed Feb. 8, 1945 4 Sheets-Sheet 4

Inventor
GASTON J. LIPSCOMB
By Church & Church
His Attorneys.

Patented Aug. 16, 1949

2,479,126

UNITED STATES PATENT OFFICE 2,479,126

LIQUID CLARIFIER

Gaston J. Lipscomb, Montclair, N. J., assignor to W. R. Grace & Co., New York, N. Y., a corporation of Connecticut Application February 8, 1945, Serial No 576,761

8 Claims. (Cl. 210—43)

This invention relates to improvements in the clarification of liquids by sedimentation and decantation and especially to a method and apparatus for clarifying sugar cane juices wherein the liquid is clarified in settling or clarifying compartments superposed one above the other.

As is well understood in this art, the liquid to be clarified is flowed into the settling compartment or compartments and the clarified liquid withdrawn or decanted from the upper portion of each compartment while the sediment or mud is discharged from the lower portion of each compartment and one object of the present invention is to increase the efficiency with which the liquid treated in the present apparatus is clarified. More specifically, the invention contemplates a series of superposed clarifying or settling compartments with a separate liquid feed for each compartment, separate decanting connections for each compartment and a mud discharge conduit common to the several compartments but so arranged with respect to the latter and to the liquid feeding and decanting connections as to absolutely preclude contamination of liquid in one compartment or in the connections thereto by mud separated from liquid in any of the other compartments.

To further increase the efficiency of the present apparatus, the invention contemplates the provision of liquid feeding and liquid decanting means such as will minimize the development of eddies or currents in the liquid in the respective clarifying compartments, thus maintaining as nearly as possible the ideal quiescent state in the several compartments.

Still another object is to provide a simple arrangement for varying and regulating the rate of flow and the distribution of liquid from the feed line into each compartment and the rate of flow of the liquid from each compartment into the decanting means therefor.

It is, of course, desirable to accurately control the rate of flow of liquid into, and the rate of flow of the decanted liquid from, the individual clarifying compartments and to regulate these rates of flow in accordance with the rate at which the sediment or mud settles in the compartment and a further object of the invention is to provide a method, and an apparatus for practicing such method, whereby the relationship between the rate of settling on the one hand, and the rates of liquid feed and decantation on the other can be readily ascertained and regulated. More specifically, this relationship is determined by decanting clarified liquid from two or more different levels in the individual compartment and varying the intake of the decanting means at the upper level until the liquid decanted from the lower level runs slightly cloudy. When this condition exists it becomes apparent that the rate of decantation from the particular compartment under observation is slightly in excess of the settling rate and the operator can thus readily control the feed and discharge of liquid to obtain the maximum benefits of the settling rate of the particular liquid being clarified.

As a further object, the present method contemplates rendering the mud extracted from the clarifying compartments more permeable so as to facilitate subsequent application of a wash solution to the mud in the usual mud filtering apparatus used for removing or displacing the sugar bearing liquor usually carried in the mud extracted from sugar cane juices. Thus the mud filters can be operated with increased efficiency.

With these and other objects in view, the invention consists in certain details of construction and combinations and arrangements of parts, all as will hereinafter be more fully described and the novel features thereof particularly pointed out in the appended claims.

In the accompanying drawings—

Fig. 2 is a transverse sectional view on the line 2—2 of Fig. 1, the mud scrapers being omitted;

Fig. 3 is a vertical sectional view on the line 3—3 of Fig. 2;

Fig. 4 is a view similar to Fig. 3 illustrating, in detail, the lower end portion of the mud discharge conduit;

Fig. 5 is a sectional view on the line 5—5 of Fig. 3;

Fig. 6 is a schematic illustration of an arrangement wherein the juice to be clarified is passed first through a filtering apparatus and then through the present clarifier, with means for commingling foreign matter from the filter with the mud from the clarifier at the mud pump or at a point in advance of the latter.

Figure 1:
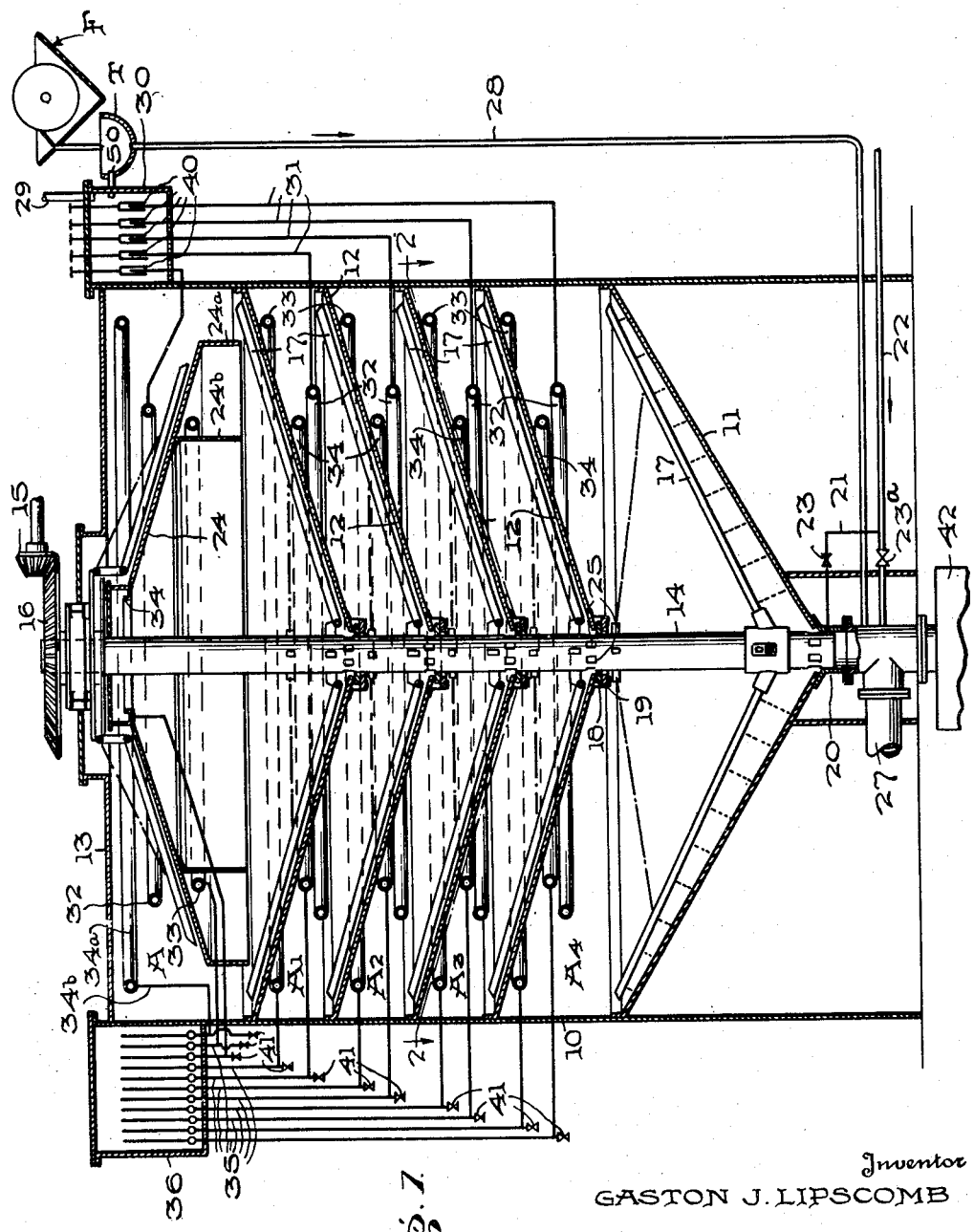
Figure 1 is a vertical sectional view taken axially of a multi-tray or a multi-compartment clarifying apparatus for illustrating more or less diagrammatically what is at present believed to be the preferred embodiment of the present invention.

In the so-called multi-tray type of clarifier adopted for purposes of illustrating the present invention, the several settling or clarifying compartments denoted at A, $A^1$, $A^2$, $A^3$ and $A^4$ are formed within a casing or shell 10 by spaced superposed partitions or trays 12, the upper compartment A being formed between the top wall 13 of the shell and the uppermost tray and the bottom compartment $A^4$ being formed between the lowermost tray 12 and the bottom wall 11 of the casing. Preferably, but not necessarily, the trays 12 and the bottom wall of the casing are dished on their upper surfaces, as shown. The several clarifying compartments are substantially alike except that the lower compartment $A^4$ is slightly larger vertically than the others and the upper compartment A is also of slightly greater depth in order to accommodate other structural features utilized for clarifying the liquid and removing the mud from this compartment. The trays or partitions 12, which are of annular formation, are attached at their peripheries to the inner surface of casing 10 and the axial openings of the several trays are arranged in vertical registry with each other and with a corresponding opening in the casing bottom 11 for reception of a hollow column or post 14 which projects above the casing top 13 whereby it may be rotated by suitable driving mechanism. For instance, power from a suitable source (not shown) may be transmitted through pinion 15 to a bevel gear 16 mounted on said post or column. Each partition 12 is provided with a bearing ring 18 around the axial opening therein which abuts against a similar ring 19 on post 14 to effectually seal the joints between the post and the several partitions. Preferably, the periphery of the post is provided with studs $14^a$ adapted to seat in slots $19^a$ in rings 19, so that the latter can ride up and down on the post 14 to maintain an efficient seal between the two sealing rings. The lower end of post 14 is rotatably received in telescopic relationship in a tubular fitting 20 attached to the under surface of the casing bottom to seal the joint around the axial opening in said bottom wall. This tubular fitting is provided with a rather restricted water passage $20^a$ which registers with an annular groove $20^b$ on the interior of said fitting whereby water may be supplied through a connection 21 to the interior of the fitting to lubricate the contacting surfaces of said fitting and post 14. This water supply line 21 may be connected to the main wash-out water supply line 22 and a valve 23 is provided in line 21 for controlling flow of water therethrough. If desired a catch-all or trap 42 may be attached to the lower end of fitting 20.

Supported on suitable arms or brackets mounted on the interior of shell 10 in the uppermost compartment A is an inverted tray 24 of truncated cone formation provided with an axial opening for post 14 and with a depending peripheral flange or skirt $24^a$. Mounted within said conical tray in spaced relation to said peripheral flange $24^a$ is a circular partition $24^b$. As will be understood, mud will settle from liquid in each of the compartments and, in the present apparatus this mud is preferably discharged from all the compartments into a conduit common to all of them. For instance, as shown, the hollow post or column may serve as the mud discharge conduit, in which event, the column is formed with a circumferential series of discharge openings 25 for each of the surfaces of the trays 12 and bottom 11. To facilitate movement of the mud from said surfaces to and through the openings 25, mud rake arms 17 mounted on post 14, are provided for each of said surfaces, said arms being so disposed with respect to their direction of rotation as to force the mud downwardly and inwardly on said surfaces. Additional mud rake arms 17 are provided for the upper surface of tray 24 whereby mud settling on said surface will be forced off the outer edge thereof and deposited on the uppermost tray 12 in the path of the rake arms for the latter. The mud pump 26 is connected to fitting 20 by pipe line 27 and the wash-out water line 22 is connected to said line 27. Valve $23^a$ is provided for controlling flow of wash-out water to line 27.

In the clarification of sugar cane juice in the present apparatus, the hot juice is pre-filtered by flowing it from the mill through filtering apparatus of the type commonly used in the paper manufacturing industry and known as a standard decker or pulp thickener. Such an apparatus, indicated at F, comprises a coarse, revolving filter screen of from 60 to 100 mesh, which removes small pieces of sugar cane and other suspended matter (but not the mud or clay), all of which is conveyed from the filter F through pipe 28 to a point at or in advance of the mud pump where it is commingled with the mud passing through pipe 27. This addition of the particles of sugar cane and other suspended matter extracted by filter F to the mud renders the latter more permeable for the wash solution used in the mud filter (not shown) for separating the sugar solutions from the extracted mud to recover as much as possible the sugar content of the mud. The filtered, hot juice is conveyed from the filter F through pipe 29 to a feed box 30 from which it is introduced into the several clarifying compartments through feed supply pipes 31. A separate feed supply pipe 31 is provided for each of the compartments A, $A^1$, $A^2$, $A^3$ and $A^4$ and each supply pipe is connected to a circular or annular feed pipe 32 in the interior of its compartment. The clarified liquid is withdrawn or decanted from the compartments through upper and lower draw-off pipes 33, 34 in each compartment and conveyed through the connected lines 35 to a draw-off box 36 while the sediment and muds accumulated in each compartment are discharged into the hollow post or shaft 14 through ports 25, as previously described.

Amongst the conditions that are essential to effecting maximum settling of mud and sediment with a minimum settling area in each clarifying compartment is the creation and maintenance of a quiescent state or state of stagnation, or as closely thereto as is possible, in each compartment so as to avoid or minimize currents or eddying of the liquid within the settling area. Such currents are caused by various factors, such as the manner in which the muddy liquid is introduced into the compartment; the manner in which the clarified liquid is withdrawn from the compartment; and the manner in which the settled solid matter or mud is removed from the compartment.

It is for the purpose of controlling these factors or eliminating their disturbing influences that a feed box with a separate feed line for each compartment and a draw-off box with separate draw-off lines for each compartment are provided. In addition, the feed pipes 32 and the draw-off pipes 33, 34 are all of special design to more effectually control these factors.

Figure 7:
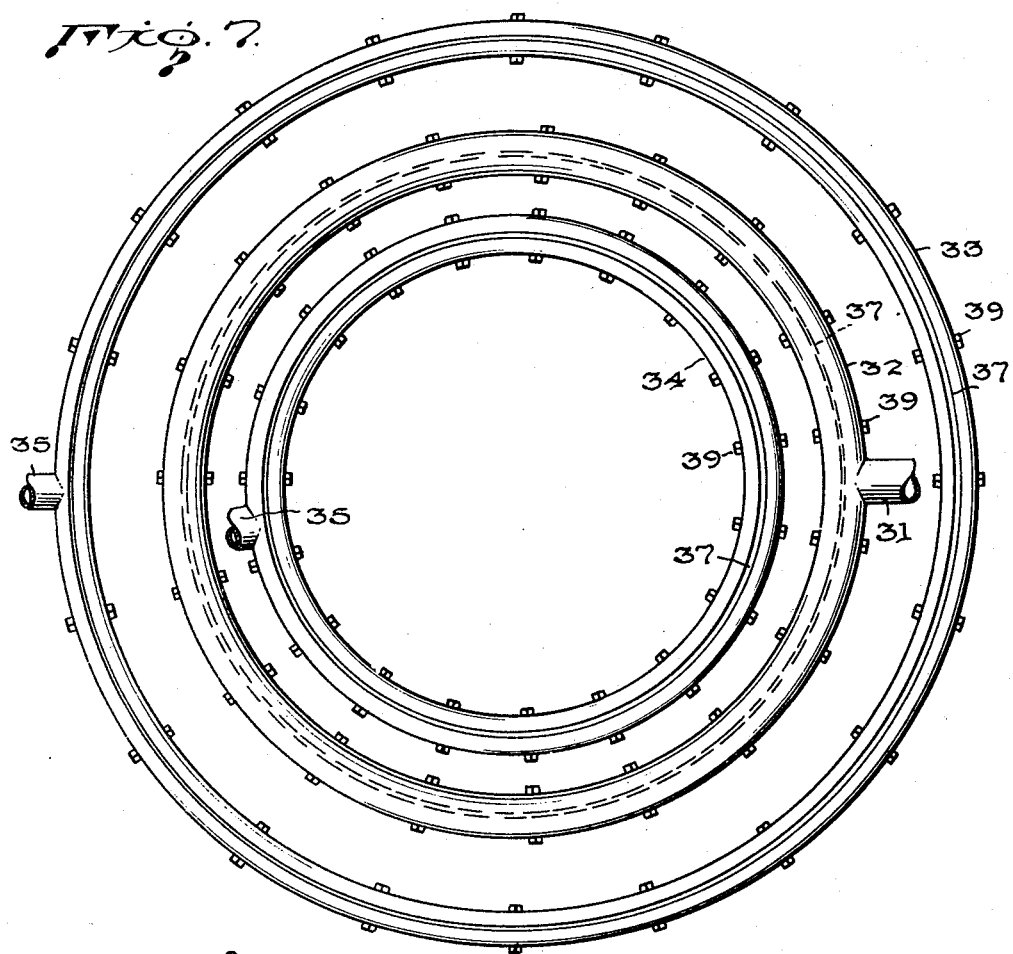
Fig. 7 is a plan view on an enlarged scale illustrating the varying width of the openings in the feed and draw-off pipes.
Figure 8:
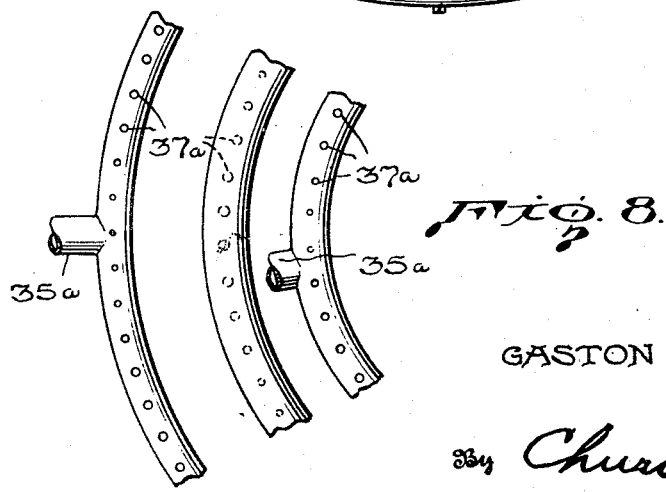
Fig. 8 is a detail view illustrating a modified form of opening in the feed and draw-off pipes.

As best illustrated in Figs. 2 and 3, the feed pipes 32 and the draw-off pipes 33, 34 are of annular or ring formation and extend around the compartment with the draw-off pipes located at different levels in the upper portion of the compartment and the feed pipe slightly below the lower draw-off pipe. A slot or a series of perforations 37 extending along the wall of the ring or annulus is provided in each of the feed or draw-off pipes with the openings in the feed pipes being disposed downwardly and the openings in the draw-off pipes being disposed upwardly. Preferably, these openings are in the form of slots and extending through each pipe transversely of the slot at points spaced circumferentially of the ring, are cross bolts 38 whereby the width of the slot can be varied by tightening or loosening the nuts 39 on the bolts at proper points along the length of the slot. Thus, by having the width of the slot in a feed pipe adjusted so that its width gradually increases in a direction from the point of connection between the feed pipe and its supply pipe, as shown in Fig. 7 a substantially equal volume of juice or liquid will be discharged into the compartment. The same result can be obtained where a series of perforations are used by graduating the size of the perforations, with the area of the individual perforations increasing as the distance between them and the supply pipe connection increases as shown in Fig. 8. Similarly, the width of the slots or the size of the perforations in the draw-off pipes 33, 34, is graduated to control the intake capacity of said pipes around the compartment.

By thus providing separate feed and draw-off pipes for each compartment with the discharge openings of the feed pipes and the intake openings of the draw-off pipes of graduated size and extending over a comparatively large area, there is a minimum disturbance of the liquid in each compartment. In other words, the ideal quiescent state is maintained as nearly as practical in each compartment because the flow of liquid to and from each clarifying compartment has no effect whatever on the bodies of liquid in the other compartments and the elongated graduated openings in the feed and draw-off pipes effect a uniform flow of liquid in and out of the compartment over extended areas which prevents localization of high velocities such as would exist if the liquid actually entered, or was decanted from, a compartment at isolated points. For these reasons a maximum rate of settling is obtained in the individual compartments.

The provision of the multiple draw-off pipes 33, 34, at different levels in each clarifying compartment is also of special advantage in that by observing the condition (cloudiness or clarity) of liquid being decanted through two pipes at different levels, the rates of flow of liquid to and from the compartment can be regulated to take full advantage of the maximum rate of settling in each compartment. Each supply line 31 is provided with a sleeve valve 40 and each draw-off line 35 is provided with a control valve 41 and by regulating and increasing the flow of liquid through the upper draw-off pipe 33 of a given compartment until the liquid decanted through the longer draw-off pipe 34 of that compartment appears cloudy the operator can readily determine the point at which the rate of supply of liquid and the rate of decantation bear the proper relationship to each other and to the rate of settling to obtain the best results. Thus, any individual compartment in a multi-compartment apparatus such as disclosed herein can be operated with maximum efficiency regardless of operating conditions of the other compartments.

Another advantage of the present construction is the provision of a single mud discharge conduit (post or hollow shaft 14) for the several compartments and the provision of a series of mud discharge openings 25 in said conduit for each compartment. By discharging the mud through a conduit at the center of the apparatus and which has no connection whatever with the feed lines for the liquid, there is no possibility of extracted mud gaining access to freshly supplied liquid and the series of discharge ports 25 for each compartment permits a substantially constant passage of mud from the compartment to the conduit regardless of the rate of rotation of the conduit. The mud pump 26 may be operated to draw constantly on the conduit and maintain a constant withdrawal of mud from each compartment without relying upon any hydraulic head to effect the discharge of mud. Hence, the discharge of mud may be readily controlled or regulated.

In the case of the upper compartment A, the draw-off pipe 33 is located under or within the inverted cone shaped tray 24, while the feed pipe 32 is located above said tray. An auxiliary draw-off pipe 34ª may also be provided above the tray 24, this auxiliary pipe being located near the perimeter of the chamber, as there is a tendency for clarified liquid to accumulate in this area. This auxiliary pipe is connected to draw-off box 36 by pipe 34ᵇ. The several draw-off connections 34ᵇ and 35 are provided with swinging terminal sections in the draw-off box in order to permit them to be adjusted to vary the level at which they discharge into said box.

The opening in top 13 of the casing through which post 14 projects is preferably of sufficient size to permit ready removal of scum and foam from top compartment A which, in effect, is subdivided into upper and lower areas by the inverted tray 24. Incidentally, the single feed pipe 32 located above the partition or tray 24 will suffice for this entire compartment but, if desired, an additional feed line may be provided beneath the inverted tray.

In connection with the pre-filtering of the juice in filter F, the liquid to be clarified frequently contains suspended matter which has a specific gravity almost identical with that of the muddy solution but slightly greater than that of the clarified liquid in the clarifying compartment. As a consequence such foreign matter does not actually settle until after the liquid has become otherwise clarified in the compartment. This not only creates a condition contrary to that required for maintaining a good settling rate by creating vertical currents from the surface but such particles tend to settle only to the upper portion of the cloudy zone, thus further reducing the efficiency of the apparatus. This difficulty is overcome by the use of the pre-filter F where the incoming solution is filtered through the revolving cylindrical coarse screen of the decker, this screen being so arranged that the liquor will pass through but the coarser suspended matter will be trapped, so to speak, and build up a mat on the face of the screen which, in turn, will trap smaller particles. Thus, the slower settling particles above mentioned are substantially eliminated from the liquor before the later reaches the clarifier. It is this filtered out matter that is commingled with the mud to render the same more permeable, as previously described.

As illustrated in Fig. 6, the foreign material or filter cake removed by filter F may be deposited in a trough T to which scum and foam from the upper clarifying compartment may also be delivered by a pipe 50. This foreign material and added scum is then fed by pipe 28 to the mud line 27. It might be added, however, that there will be very little foam or scum formation by reason of the pre-filtering step.

From the foregoing it will be appreciated that the present apparatus can be operated with maximum efficiency so far as concerns clarification of the liquid or juice and, at the same time, the extracted mud is prepared for the efficient recovery of sugar solutions carried thereby.

What I claim is:

1. The combination of a multi-tray clarifier comprising a plurality of superposed clarifying compartments, a filtering chamber comprising a filter, means for supplying filtered liquid from said chamber to said compartments, means for withdrawing clarified liquid from said compartments, a mud discharge line having inlets located in said compartments, and means for delivering filtered foreign matter from said filtering chamber to said mud discharge line to commingle said matter with the mud discharged from said compartments.

2. The combination of a multi-tray clarifier comprising a plurality of superposed clarifying compartments, a filtering chamber comprising a filter, means for supplying filtered liquid from said chamber to said compartments, means for withdrawing clarified liquid from said compartments, said chamber having a discharge outlet for foreign matter filtered from the liquid and said compartments each having a discharge outlet for mud, a discharge conduit common to all of said mud discharge outlets, a mud pump connected to said conduit, and means for commingling the foreign matter discharged from the filtering chamber with mud discharged from said clarifying compartments through said mud discharge conduit to said pump.

3. The combination of a multi-tray clarifier comprising a plurality of superposed clarifying compartments, a filtering chamber comprising a filter, means for delivering filtered liquid from said chamber to said compartments, means for withdrawing clarified liquid from said compartments, each of said compartments having a mud discharge outlet near the bottom thereof a mud discharge line with which said mud outlets communicate, and said filtering chamber having a discharge for foreign matter filtered from liquid in said chamber, said filtering chamber discharge being connected to said mud discharge line at a point below the lowermost clarifying compartment.

4. The combination of a multi-tray clarifier comprising a plurality of superposed clarifying compartments, a filtering chamber comprising a filter, means for delivering filtered liquid from said chamber to said compartments, means for withdrawing clarified liquid from said compartments, each compartment having a mud discharge outlet near the bottom thereof a mud discharge line with which all of said mud outlets connect, said filtering chamber having a discharge for foreign matter filtered from liquid in said chamber, and means for commingling the discharged mud and discharged foreign matter in said mud discharge line.

5. In a liquid claryifing apparatus, means for withdrawing clarified liquid from a clarifying compartment and minimizing cross currents therein comprising two vertically spaced and concentrically arranged annular pipes having intake openings in the walls thereof, said intake openings extending substantially throughout the length of said pipe, and means for varying the size of said openings to form an intake of increasing area longitudinally of said pipes, whereby liquid will be withdrawn at a uniform rate at all points along said pipes.

6. In a liquid clarifying apparatus, means for withdrawing clarified liquid from a clarifying compartment comprising two concentrically arranged annular pipes extending around said compartment and spaced vertically from each other, and a separate draw-off conduit connected to each pipe, said pipes having intake openings in the walls thereof extending substantially the entire length of the respective pipes said openings increasing in area lengthwise of the pipes from the draw-off conduit connection to withdraw clarified liquid at substantially uniform rates around said pipes thereby minimizing cross currents in the compartment.

7. In the process of clarifying liquids the steps of flowing the liquid through a filtering compartment to superposed clarifying compartments, overflowing clarified liquid from the upper portion of each clarifying compartment and discharging from the lower portion of each clarifying compartment a stream of mud, and discharging from said filtering compartment into mud discharged from the clarifying compartments the foreign matter filtered from liquid passing through said filtering compartment.

8. In the process of clarifying liquids by the sedimentation and decantation method which consists in flowing the liquid into a settling clarifying compartment and overflowing clarified liquid from the upper portion of said compartment while discharging sediment and mud from the lower portion of said compartment, the steps of overflowing the clarified liquid from two different levels in the upper portion of said compartment and varying the rate of overflow from the higher level to determine the rate of settlement of sediment in said compartment.

G. J. LIPSCOMB.

REFERENCES CITED

The following references are of record in the file of this patent:

UNITED STATES PATENTS

| Number | Name | Date |
|---|---|---|
| 579,043 | Cloudman | Mar. 16, 1897 |
| 624,533 | Pead | May 9, 1899 |
| 804,968 | Miller | Nov. 21, 1905 |
| 815,093 | Keeney | Mar. 13, 1906 |
| 1,093,994 | Kaibel | Apr. 21, 1914 |
| 1,122,625 | McNutt | Dec. 29, 1914 |
| 1,135,997 | Dorr | Apr. 20, 1915 |
| 1,741,187 | Fuqua | Dec. 31, 1929 |
| 1,908,102 | Arledter | May 9, 1933 |
| 1,960,904 | Gilchrist | May 29, 1934 |
| 2,185,785 | Dorr et al. | Jan. 2, 1940 |
| 2,253,878 | Weber | Aug. 26, 1941 |
| 2,377,875 | Geissler | June 12, 1945 |

FOREIGN PATENTS

| Number | Country | Date |
|---|---|---|
| 724,614 | France | Jan. 29, 1932 |